United States Patent [19]

Nishimoto

[11] Patent Number: 4,692,814
[45] Date of Patent: Sep. 8, 1987

[54] JITTER-IMMUNE TIME EXPANSION FOR TIME-COMPRESSED LINE-SEQUENTIAL VIDEO SIGNALS

[75] Inventor: Naomichi Nishimoto, Tokyo, Japan

[73] Assignee: Victor Company of Japan, Ltd., Yokohama, Japan

[21] Appl. No.: 666,732

[22] Filed: Oct. 31, 1984

[30] Foreign Application Priority Data

Oct. 31, 1983 [JP] Japan ................................. 58-205631
Oct. 31, 1983 [JP] Japan ................................. 58-205632

[51] Int. Cl.4 ............................................ H04N 9/89
[52] U.S. Cl. ...................................................... 358/320
[58] Field of Search ............... 358/310, 320, 324, 325, 358/326, 330, 334, 12; 360/36.2

[56] References Cited

U.S. PATENT DOCUMENTS

| 4,084,181 | 4/1978 | Mita et al. ........................... 358/323 |
| 4,210,927 | 7/1980 | Yumde et al. . | |
| 4,335,393 | 6/1982 | Pearson . | |
| 4,376,957 | 3/1983 | Dischert et al. ..................... 358/334 |
| 4,467,368 | 8/1984 | Horstmann ........................... 358/334 |
| 4,575,749 | 3/1986 | Acampora et al. .................. 358/315 |

FOREIGN PATENT DOCUMENTS 3323444 12/1983 Fed. Rep. of Germany .

Primary Examiner—Donald McElheny, Jr.
Attorney, Agent, or Firm—Cushman, Darby & Cushman

[57] ABSTRACT

In an apparatus for time-compression video recording and time-expansion reproduction, first and second memory address counters are initialized in response to there being a simultaneous presence of vertical and horizontal sync pulses. Until the next vertical blanking period the counters are continuously incremented at different rates during mutually exclusive times for successively writing and reading the luminance component of a composite color television signal. A third memory address counter operable in recyclically variable count modes is provided for writing and reading the color-difference components at sequentially varying rates during a count cycle and generating an output pulse at the end of the count cycle. A phase comparator detects the phase difference between the horizontal sync pulse and the output pulse of the third address counter. A variable frequency oscillator is responsive to the phase difference for incrementing the third address counter at a rate corresponding to the phase difference.

4 Claims, 6 Drawing Figures

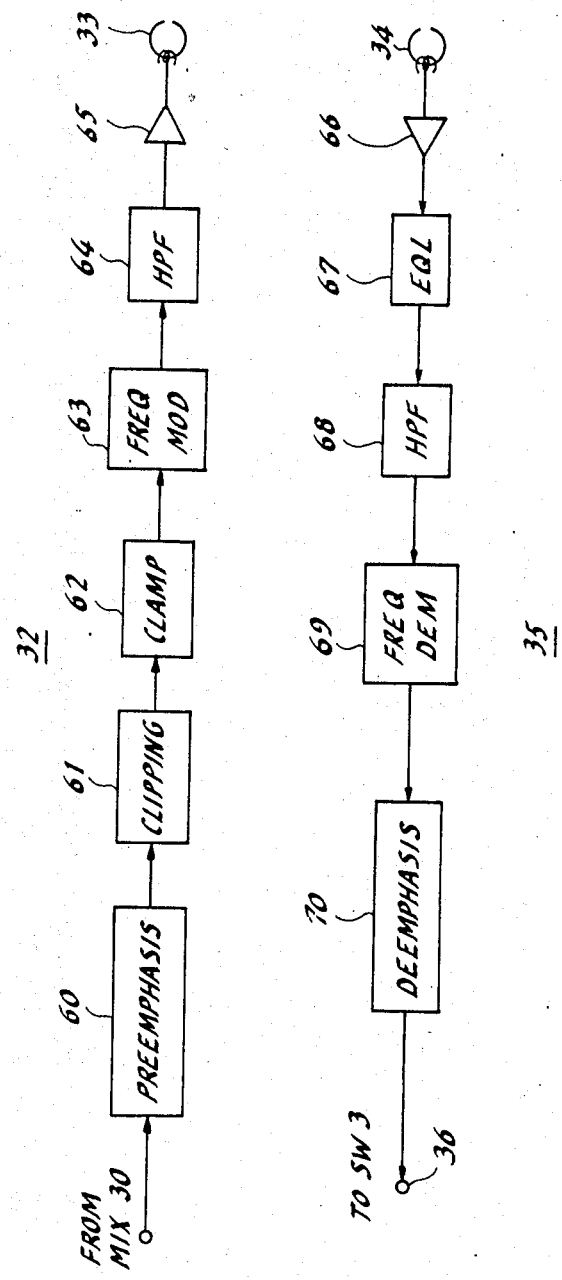

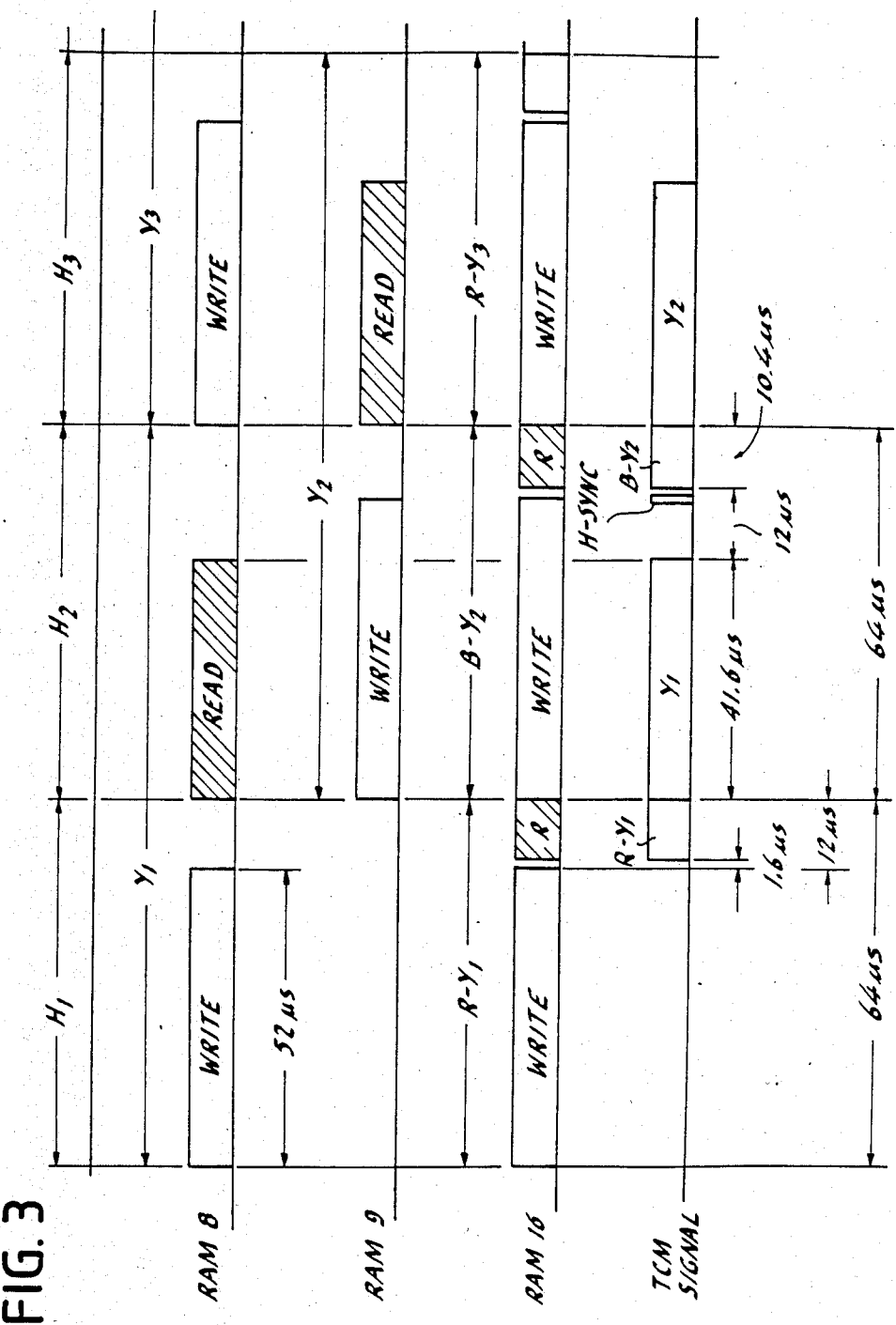

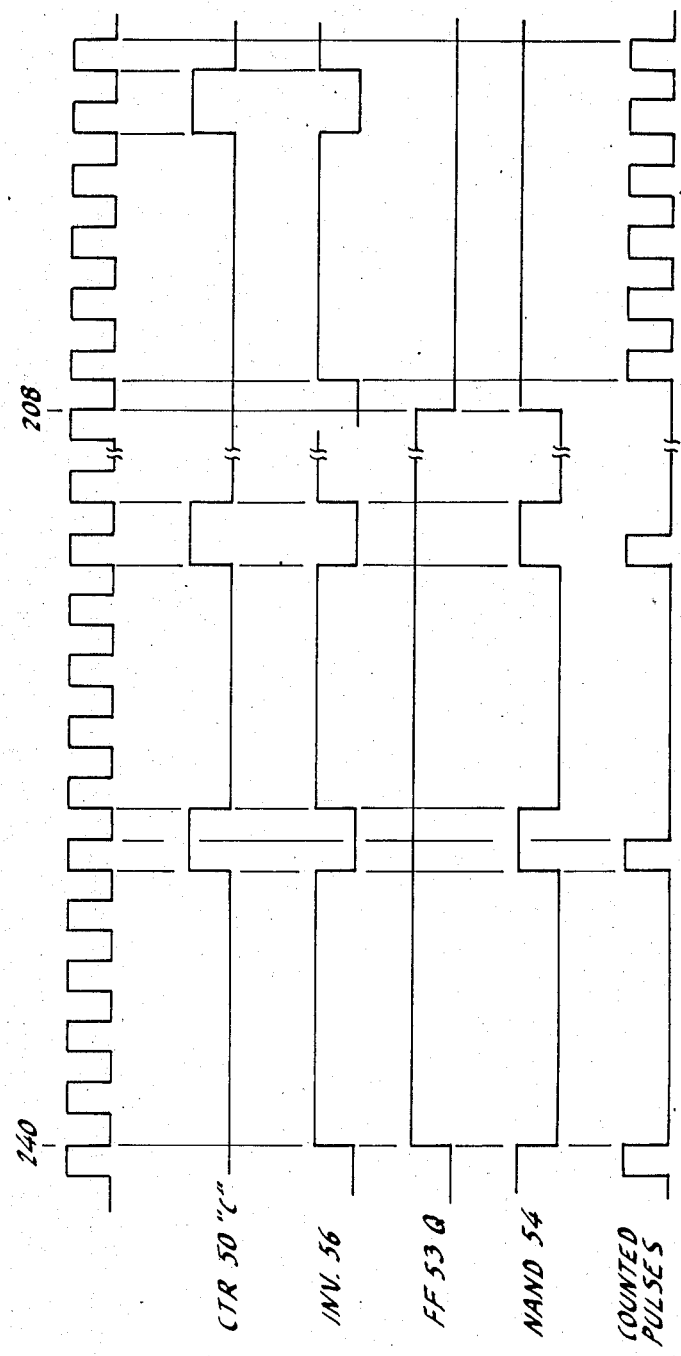

JITTER-IMMUNE TIME EXPANSION FOR TIME-COMPRESSED LINE-SEQUENTIAL VIDEO SIGNALS

BACKGROUND OF THE INVENTION

The present invention relates generally to video recording and reproducing apparatus, and more specifically to a jitter-immune circuit for expanding a time-compressed, line-sequentially multiplexed video signal.

Current video recording techniques involve modulating the frequency of the luminance component of a composite color television signal, converting the frequency of the chrominance component to a lower frequency in the video spectrum and multiplexing the luminance and chrominance components in a frequency-division multiplexed format. However, the desire to achieve high quality video reproduction has brought about a time compression and expansion technique in which the luminance and color-difference components are time-compressed, line-sequentially multiplexed and modulated in frequency upon a carrier having a higher frequency than the carrier employed in the frequency-division multiplex recording. Since the luminance and color-difference signals do not coexist at the same time, the time compression technique has advantages of avoiding undesirable interference between them and avoiding undesirable Moire fringe pattern inherent in the frequency-division multiplex recording. Furthermore, the use of the higher frequency carrier eliminates the azimuth loss which is likely to cause crosstalk between adjacent tracks. A further advantage of the time compression technique is that it results in a spectral distribution of energies having a higher concentration in the lower frequency band of the spectrum and a lower energy concentration in the higher frequency band. This profile of spectral disctribution lends itself to frequency modulation, resulting in a higher modulation index and a significant improvement in signal-to-noise ratio.

The time-compression technique requires read-write memories for writing and reading signals at sequentially varying rates for time compression and expansion under control of address counters. Because of the line-sequential signal format, the address counters need to be initialized at the beginning of each horizontal scan to align the timing of write operation with the timing of read operation. However, due to mechanical tolerances inherent in recording apparatus, reproduced signals are severely affected by jitter and noise, causing the horizontal sync to deviate from the reference time and hence the occurrence of a misregistration between the recovered luminance and color components. One approach would be to employ a time base corrector. However, the cost is prohibitive for extensive household applications.

SUMMARY OF THE INVENTION

The foregoing problem is solved and and improvement is achieved in accordance with the present invention incorporated in an apparatus for processing a line sequential video signal including time compressed luminance and chrominance signals, vertical and horizontal sync pulses, one of the horizontal sync pulses coinciding with each of the vertical sync pulses. The video signal is formatted in blocks of video lines each containing a group of luminance samples and a group of chrominance samples, the group of the luminance samples being compressed in accordance with a ratio M/N and the group of the chrominance samples being compressed in accordance with a ratio (N-M)/N, wherein M and N are integers and M is greater than N-M.

According to the present invention, the apparatus comprises first, second and third memories. A timing circuit is responsive to the line and vertical sync pulses for generating first, second and third frequencies corresponding to the integers N, M nad N-M, respectively. A coincidence detector detects a coincidence between one of the horizontal sync pulses and each of the vertical sync pulses. A first read-write control circuit responds to the detection of the coincidence by initiating writing the group of luminance samples during alternate line intervals into the first and second memories at the first frequency so that the line intervals during which the luminance samples are written into the first memory alternate with those during which the luminance samples are written into the second memory, and reading luminance samples from the first and second memories during alternate line intervals at the second frequency so that the line intervals during which the luminance samples are read out of the first memory alternate with those during which the luminance samples are read out of the second memory. A second read-write control circuit, or address counter responds to each of the horizontal sync pulses by storing the group of the chrominance samples of each video line into the third memory at the first frequency and subsequently reading chrominance samples out of the third memory at the third frequency.

In operation, the first read-write control circuit is enabled in response to the detection of a coincidence between a horizontal sync pulse and a vertical sync pulse to store the group of luminance samples of a given video line into the first memory and the group of luminance samples of a subsequent video sample into the second memory at the first frequency which is typically 20 MHZ and corresponds to the integer N (=5). Immediately following the write operation of each of the first and second memories, the stored luminance samples are read out of these memories at the second frequency which is 16 MHz and corresponds to the integer M (=4). The second read-write control circuit is timed with the horizontal sync pulse to write the group of chrominance samples of each wide line into the third memory at 20 MHz and subsequently read the stored chrominance samples at the third frequency which in 4 MHz and corresponds to th integer N-M (=1). The luminance samples are thus expanded on time scale with a ratio N/M and the chrominance samples are expanded on time scale with a ratio N/(N-M) to generate a video signal which is a replica of the original luminance and chrominance signals.

Since the read-write operation of the first read-write circuit is timed with a horiziontal sync pulse that occurs at the starting point of each vertical scan, an undesirable effect caused by a jitter in a given vertical scan period terminate at the starting point of the next vertical scan period. Therefore, the luminance and chrominance samples are out of registry only for as long as a vertical scan interval if the line sequential time compressed video signal is affected by a jitter.

Preperably, the second timing circuit comprises a phase locked loop having a phase comparator, a variable frequency oscillator coupled through a low-pass filter to the output of the phase comparator and an address counter for counting the output of the variable frequency oscillator to provide an output which is compared in phase with the horizontal sync pulse by the phase comparator.

According to a second feature of the present invention, a third address counter which is operable in recyclically variable count modes is provided in a closed loop for accessing a third read-write memory at a higher rate for writing time-compressed color-difference signals into the memory during a first period of a count cycle and then at a lower rate for reading the stored signals during a second period of the count cycle and generating an output pulse at the end of the count cycle. A phase comparator detects a phase difference between the horizontal sync pulse and the counter output pulse to drive a variable frequency oscillator which clocks the third address counter.

BRIEF DESCRIPTION OF THE DRAWINGS

The present invention will be described in further detail with reference to the accompanying drawings, in which:

FIG. 2 is a block diagram of typical circuits for frequency modulation recording and frequency demodulation reproduction employed in the invention;

FIG. 3 is a timing diagram useful for describing the time compression of luminance and color-difference signals;

FIG. 5 is a timing diagram useful for understanding the operation of the counter of FIG. 4.

DETAILED DESCRIPTION

Figure 1A:
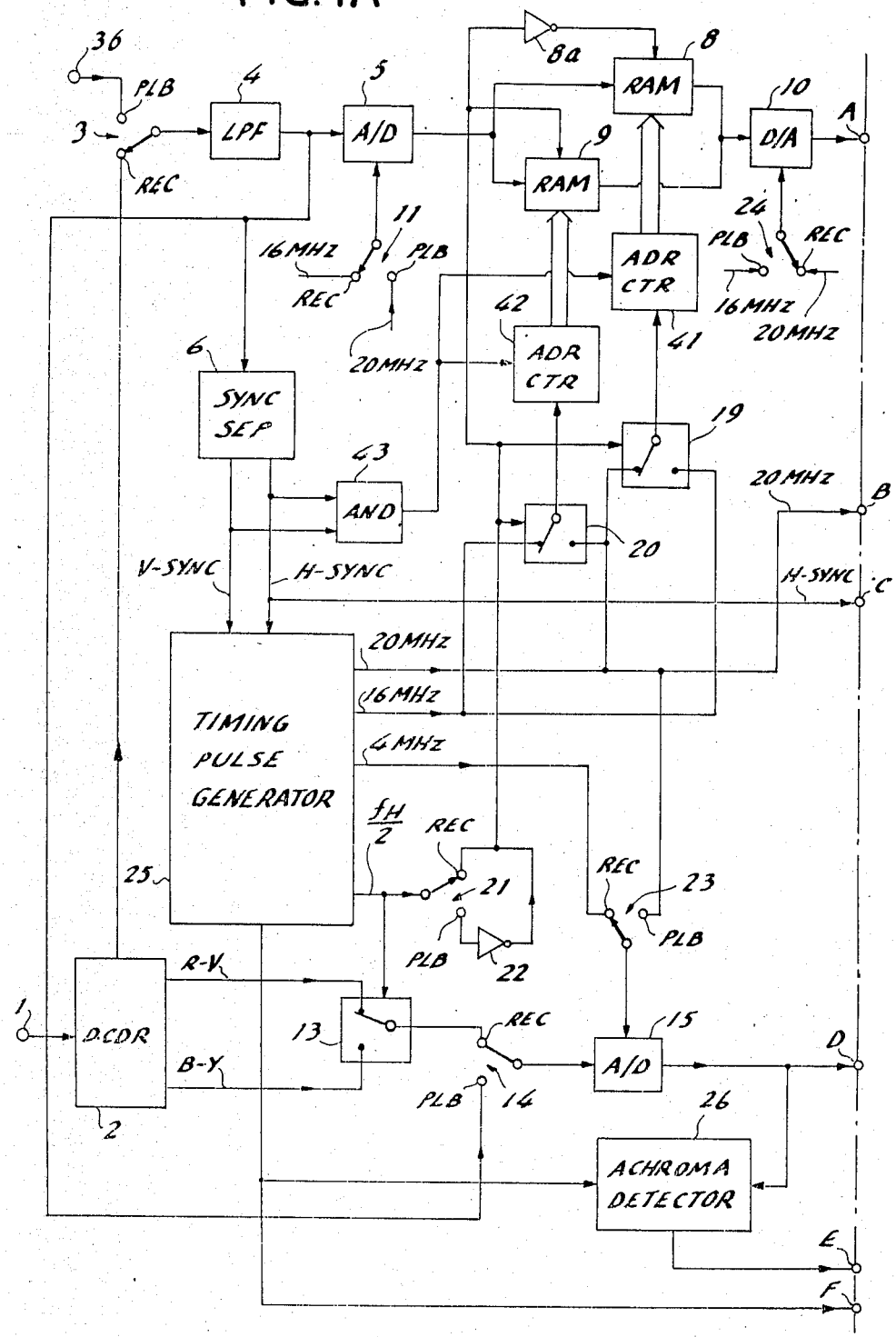
FIGS. 1A and 1B are block diagrams of an embodiment of the present invention.
Figure 1B:
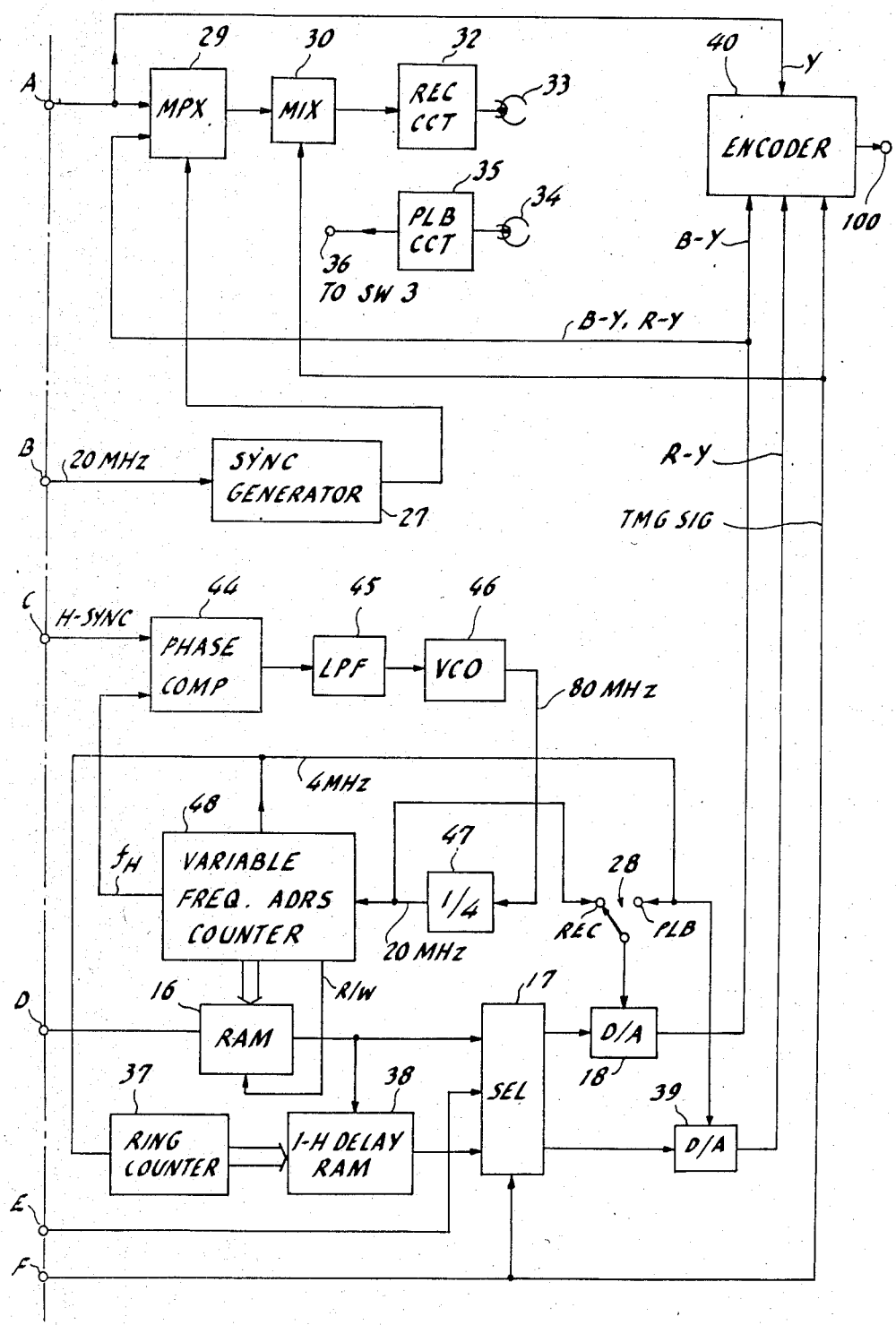

A recording/reproducing apparatus according to the present invention shown separately in FIGS. 1A and 1B is adapted to receive composite color video signals through terminal 1 to a video decoder 2 where the luminance, or Y-signal component is separated for application through a record-playback mode select switch 3 and a low-pass filter 4 to an analog-digital converter 5. The color difference components R-Y and B-Y are separated by decoder 2 from the Y-signal for application to respective contacts of an electronic analog switch 13. For purposes of explanation, it is assumed that the received video signal is of the PAL system format. Vertical and horizontal sync pulses, extracted from the Y-signal by a sync separator 6, are applied to a known timing pulse generator 25 which derives various timing control signals from the vertical and horizontal sync pulses. One typical function of this timing pulse generator is to provide clock pulse signals at frequencies 20 MHz, 16 MHz and 4 MHz. These clock signals are used as a time base to perform time compression and expansion operations which will be detailed below.

During recording mode the 16-MHz clock is applied through mode select switch 11 to the analog-digital converter 5 for sampling the Y-signal at 16-MHz rate and coding the analog video samples into 16-MHz digital video samples for coupling to read-write memories, normally random access memories 8 and 9. Address counters 41 and 42 generate address codes for accessing the memories 8 and 9 for sequentially writing and reading the Y-signal digital samples at successively varying rates to compress its time scale by a factor of 4/5 during recording mode and expand it by a factor of 5/4 to recover the original time scale during playback mode. To accomplish this time-compression and expansion the 20- and 16-MHz clock pulses are applied through switches 19 and 20 to address counters 41 and 42. Timing pulse generator 25 provides square-wave switching control pulses having a duration of 64 microseconds at one-half the horizontal line frequency, the control pulses being supplied to the control terminals of switches 19 and 20 and to the read/write enable terminals of memories 8 and 9 by way of a mode select switch 21 directly during recording mode or via an inverter 22 during playback mode. An inverter 8a is provided to reverse the polarity of the read/write control pulses applied to RAM 8 in relation to those applied to RAM 9. During recording mode switch 19 applies the 16-MHz clock to address counter 41 for a 64-microsecond horizontal line period to address the RAM 8 for writing the Y-signal, while switch 20 applies 20-MHz clock to counter 42 to address the RAM 9 for reading the stored signal. In the next line scan counters 41 and 42 are clocked at 20- and 16-MHz, respectively, in read and write operations to effect the time compression of the digital Y-signal. During playback, the switching control pulses are reversed in polarity by inverter 22 to reverse the process to effect the time expansion of the compressed Y-signal.

With the time compression of Y-signal the 64-microsecond interval between the original horizontal sync pulses is compressed to 51.2 microseconds. The Y-signal which has occupied the 52-microsecond period within the 64-microsecond scan interval is now compressed to 41.6 microseconds. As shown in FIG. 3, a luminance signal $Y_1$ during a horizontal line scan $h_1$ is written into memory 8 at 16 MHz and read out therefrom at 20 MHz during the next line scan $H_2$. Concurrently, luminance signal $Y_2$ is written into memory 9 at 16 MHz and read out at 20 MHz during line scan $H_3$.

The time-compressed digital Y-signal samples are fed to a digital-analog converter 10 which is driven by 20-MHz rate clock supplied via mode select switch 24 during recording. A time-compressed analog Y-signal appears at terminal A which couples the output of DA converter 10 to one input of an analog multiplexer 29.

According to one feature of the present invention, address counters 41 and 42 are initialized to a predetermined count state in response to an output signal from an AND gate 43 which generates it upon the occurrence of a coincidence between a horizontal sync pulse and a vertical sync pulse. This initialization allows the address counters 41 and 42 to become free from the jitter-affected timing of horizontal sync which would otherwise cause misregistration of memory locations between write and read operations in playback mode. Video samples stored in RAM's 8 and 9 are retrieved from right memory locations at right timing even if the reproduced signal is affected with jitter or noise which is inherent in recording/playback systems due to mechanical tolerances.

In response to the switching signal at one-half the line frequency $f_H$ the color difference signals R-Y and B-Y are alternately coupled by switch 13 to form a line-sequential signal which is applied through a mode select switch 14 to an analog-digital converter 15 where it is converted to digital samples. In recording mode AD converter 15 is driven by 4-MH clock which is coupled through a mode select switch 23, the output of AD converter 15 being fed through terminal D to a RAM 16. A variable-frequency address counter 48 generates an address code at a frequency which is variable at intervals of predetermined counts in a manner as will be detailed below for accessing the RAM 16 at a low-to-high varying rate during recording and at a high-to-low varying rate during playback. In recording mode the 4-MHz color-difference digital samples are written into memory 16 at 4 MHz rate and then read at 20 MHz to achieve the compression ratio of 1/5, so that color difference signal $R-Y_1$ is time-compressed to 10.4 microseconds and occupies an end portion of the horizontal scan $H_1$ as seen in FIG. 3. Likewise, color difference signals $B-Y_2$ and $R-Y_3$ are time-compressed during the end portions of horizontal scans $H_2$ and $H_3$.

According to a second feature of the present invention, the variable-frequency address counter 48 forms a phase-locked loop with a phase comparator 44, low-pass filter 45, voltage-controlled oscillator 46 and divide-by-4 counter 47. Phase comparator 44 provides phase coparison between horizontal sync pulses supplied through terminal C from sync separator 6 and an output signal from the address counter 48, the output of phase comparator 44 being coupled through low-pass filter 45 to VCO 46 so that the latter generates an output at a frequency 80 MHz. Counter 47 counts down the VCO frequency to derive a 20-MHz clock for coupling to the address counter 48.

Figure 4:
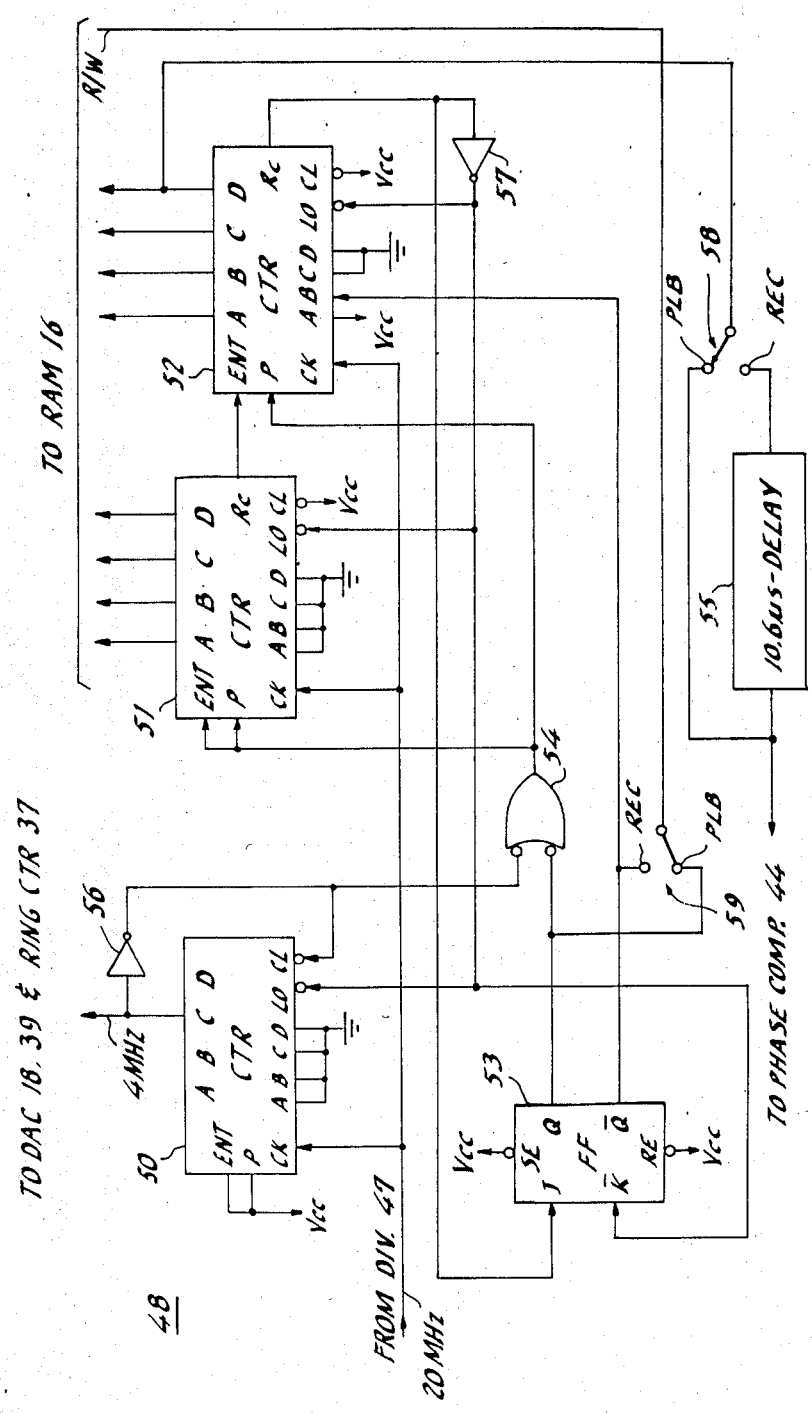
FIG. 4 is a block diagram of a memory address counter connected in the phase-locked loop of FIG. 1B.

Referring to FIG. 4, the variable frequency address counter 48 comprises a divide-by-5 counter 50 and a pair of 4-bit counters 51 and 52. Counter 51 has a "ripple" carry output terminal Rc coupled to the enable terminal ENT of counter 52 to form an 8-bit counter and their 8-bit parallel conductors are coupled to RAM 16. Counter 50 has its C-output terminal coupled through an inverter 56 to the clear terminal CL thereof to clear the count state in response to receipt of every five clock pulses from divider 47 and develops a 4-MHz output pulse at the C terminal (FIG. 5). Counters 51 and 52 are programmed to recyclically generate a first carry signal at a count value of 240 which corresponds to 240 clock pulses and a second carry signal at a count value of 208 which corresponds to 1040 clock pulses. This is achieved by coupling the A-stage program input of counter 52 to voltage supply Vcc, coupling the B-stage program input to the complementary output of a J-K flip-flop 53 and grounding the C- and D-stage program inputs, while grounding all the program inputs of counter 51. The signal on the complementary output of flip-flop 53 determines whether the counters 51 and 52 are in a 240-count mode (high speed count at 20 MHz) or a 208-count mode (low speed count at 4 MHz).

A NAND gate 54 is provided having one input coupled to the output of inverter 56. A second input of this NAND gate is taken from the true output of flip-flop 53. Counters 51 and 52 operate to count every clock pulse from divide-by-4 counter 47 when the signal on the output of NAND gate 54 is high and switch to count every fifth clock pulse when the signal on the NAND gate output is low. At the count of every 240 clock pulses, counter 52 develops a carry signal which is supplied from terminal Rc to the J input of flip-flop 53, switching the true output to a high voltage level. This carry signal is also passed through inverter 57 to inverted load enable inputs of counters 50, 51 and 52 and to the inverted K input of flip-flop 53 and all the counters are reset to zero.

With the Q output of flip-flop 53 and the output of inverter 56 being high, NAND gate 54 is conditioned to generate a low-level signal which disables counters 51 and 52. Since the output of NAND gate 54 varies with the output level of inverter 56 as long as the Q output of flip-flop 53 is high, counters 51 and 52 are disabled for a period of four 20-MHz clock pulses for every five such clock pulses during 208-bit count mode. As this process continues, counter 52 generates a second carry signal at the count of 208 clock pulses which are enabled at every five 20-MHz clock pulses. This second carry signal resets the flip-flop 53 and the NAND gate 54 output now goes high to repeat the 240-clock count mode.

Since the outputs of flip-flop 53 serve to indicate the count modes of address counter 48, the true output of this flip-flop is coupled through a mode select switch 59 to the read/write enable terminal of RAM 16 to drive it at 4-MHz rate in write mode when counter 48 is in the 208-clock count mode during recording and the complementary output of this flip-flop is coupled to RAM 16 to store the time-compressed color-difference signals at 20-MHz rate when counter 48 is in the 240-clock count mode during playback.

Due to the compression of the original 64-microsecond line interval to 51.2-microsecond interval, new, a horizontal sync pulse is inserted at a location which is displaced by a period of 10.6 microseconds with respect to the location of the original horizontal sync (FIG. 3). More specifically, the MSB pulse output of counter 52, which is generated at the end of 208 counts, is time coincident with the new horizontal sync during playback, but deviates therefrom by 10.6 microseconds during recording. To compensate for this time difference, a 10.6-microsecond delay circuit 55 is included in address counter 48. Delay circuit 55 is switched into circuit with the MSB terminal of counter 52 by a mode select switch 58 during recording and switched out of circuit during playback.

The time base of address counter 48 is thus locked in reference phase even if the horizontal sync is affected by jitter by the closed loop operation. This operation is particularly advantageous during playback since the effect of jitter is intensified by the expansion factor and severely affects the clock timing.

Returning to FIGS. 1A and 1B, the time-compressed line-sequential color-difference digital samples from RAM 16 are applied through a data selector 17 to a digital-analog converter 18. During recording this converter 18 is driven by the 20-MHz clock from the output of divide-by-4 counter 47 through a mode select switch 28 and in playback mode it is driven by the jitter-free 4-MHz clock supplied from the C-terminal of counter 50 of address counter 48. A one-line delay memory, or RAM 38 is connected to the output of RAM 16 to introduce a delay interval of one horizontal scan during playback for purposes of separating the line-sequential color-difference signals into respective components. This delay RAM is accessed at 4 MHz by a ring counter 37 which is in turn driven by the clock supplied from the address counter 48. A digital-analog converter 39, connected to an output of selector 17, also functions during playback to convert the separated color-difference digital samples to analog form by 4-MHz clock supplied from address counter 48.

During recording, the 1-line delay memory 38 remains inoperative and data selector 17 operates to pass the output of RAM 16 in sequence so that the output of DA converter 18 is a line-sequential color-difference analog signal, which is applied to a second input of the analog multiplexer 29.

During playback data selector 17 provides separation of R-Y and B-Y color-difference digital samples which are respectively converted to analog form by DA converters 18 and 19 and applied to a known encoder 40 where they are combined with the analog Y signal from DA converter 10.

To accomplish the separation of the line-sequential color-difference signals during playback, the timing pulse generator 25 derives a discrimination timing signal from vertical and sync pulses. This signal indicates the location in which an achromatic pulse is to be inserted in a 12-microsecond interval (FIG. 3) between the time-compressed Y-signal (41.6 microseconds) and the time-compressed color-difference signal (10.4 microseconds). Achromatic pulses are generated by a known achroma detector 26. The achroma detector is connected to the timing pulse generator 25 and to the output of AD converter 15 to detect digital samples which occur at locations specified by the discrimination timing pulse and takes an average value of such digital samples and generates an achromatic pulse having a width indicating the respective color-difference signal. The achromatic pulse is fed through terminal E to a third input of the data selector 17 and the discrimination timing pulse is fed through terminal F to the switching control terminal of data selector 17.

This discrimination timing pulse is applied to the encoder 40 during playback to enable it to process on the luminance and color-difference signals applied thereto by imposing frequency modulation to generate a color sub-carrier according to the PAL system format.

The analog signals applied to the multiplexer 29 are combined with vertical and horizontal sync pulses generated by a sync generator 27 which is coupled from the 20-MHz clock terminal of the timing pulse generator 25. Horizontal sync is inserted to a specified location of the 12-microsecond interval between the time-compressed Y-signal and the time-compressed color-difference signal, which is displaced by 10.6 microseconds with respect to the instant at which a readout operation of RAM 16 will begin during playback. Time-compressed, multiplexed analog signal is delivered from multiplexer 29 to a mixer 30 where it is further combined with the discrimination timing pulse supplied from timing pulse generator 25.

The output of mixer 30 is coupled to a recording circuit 32 and thence to a recording head 33 to provide a record on a magnetic medium. The recorded signal is picked up by a playback head 34 and applied to a playback circuit 35 and thence to a terminal 36 which is connected to the playback terminal of mode select switch 3.

FIG. 2 illustrates a typical example of the recording and playback circuits. Recording circuit 32 comprises a preemphasis circuit 60, a clipping circuit 61, a clamp circuit 62 and a frequency modulator 63 the output of which is passed through a high-pass filter 64 and an amplifier 65 to head 33. The output of mixer 30 is applied to preemphasis circuit 60 for purposes of noise suppression. Clipping and clamping actions are performed by circuits 61 and 62 in a known manner prior to frequency modulation by circuit 63. The recorded, frequency-modulated signal is detected by head 34, amplified at 66 and equalized at 67 and passed through a high-pass filter 68 to a frequency demodulator 69 and thence to a deemphasis circuit 70, the output of which is coupled to the playback terminal of switch 3.

Recording operation will begin with all the mode select switches being positioned to the REC terminal. Time-compressed Y signals are line-sequentially interleaved with time-compressed color-difference signals and recorded on magnetic medium through the recording circuit 32.

Playback operation will begin with all the mode select switches being transferred to the PLB terminal. Frequency demodulated time-compressed, multiplexed analog signal is derived from playback circuit 35 and is passed through mode-select switch 3 and low-pass filter 4 and applied to AD converter 5 and sampled at 20-MHz and converted to 20-MHz digital samples. Time-scale expansion is performed on the Y-signal digital samples alternately by RAM's 8 and 9 in response to address codes provided by address counters 41 and 42. The counters 41 and 42 are initialized to predetermined address count in response to a horizontal sync pulse that occurs in each vertical retrace period. This initialization takes place once for each field interval. After being initialized, counters 41 and 42 are supplied continuously with clock pulses of different frequencies, first at 20 MHz and then at 16 MHz, as switched by switches 19 and 20 at one half the line frequency so that the time scale of the horizontal scan including a Y-signal and a horizontal sync pulse is expanded to the original scale. Address counters 41 and 42 are switched from a write to a read operation without interruption by switching their count states from the maximum to the predetermined initial count in response to the occurrence of a transition of clock frequency from 20 MHz to 16 MHz and vice versa. This process is repeated until the next vertical sync pulse. The time-expanded digital Y-signal is converted to analog form by DA converter 10 and fed to encoder 40.

The output of low-pass filter 4 is also routed through mode-select switch 14 to AD converter 15 which is driven at 20 MHz and applied to RAM 16 where the color-difference digital samples are separated from the Y-signal by addressing RAM 16 at the beginning of each time-compressed color-difference signal. During each expansion cycle, RAM 16 is first addressed in write mode at 20 MHz and then at 4 MHz in read mode, expanding the time-compressed B-Y and R-Y digital samples in a line sequential manner.

The horizontal sync pulse supplied to phase comparator 44 is affected by jitter as mentioned above and this effect is intensified by the expansion factor 5 to a degree which is beyond the control range of the phase-locked loop of conventional television receivers. Since the time base of RAM 16 is phase-locked with reference phase, the clock timing of RAM 16 is maintained within the control range of conventional television receivers to which the reproduced television signal is applied and is kept in a constant phase relationship with the clock timing of RAM's 8 and 9.

Ring counter 37 is driven at 4 MHz to write data sequentially read out of RAM 16 into 1-line delay RAM 38. The color-difference digital signal stored in RAM 38 is delivered at time delayed a line scan period to data selector 17. Achroma detector 26 detects an achromatic pulse from the reproduced signal and feeds the data selector 17 which also receives a distribution timing pulse from timing pulse generator 25 to differentiate between the two color-difference signals and properly distribute B-Y and R-Y digital signals to DA converters 18 and 39, respectively. Encoder 40 processes on analog color-difference signals and analog Y signal to form a composite color television signal for application to a television receiver through output terminal 100.

The foregoing description shows only preferred embodiments of the present invention. Various modifications are apparent to those skilled in the art without departing from the scope of the present invention which is only limited by the appended claims.

What is claimed is:

1. Apparatus for processing a line sequential video signal including time compressed luminance and chrominance signals, horizontal sync pulses and vertical sync pulses, one of said horizontal sync pulses coinciding with each of said vertical sync pulses, said video signal being formatted in blocks of video lines, each of said lines containing a group of luminance samples and a group of chrominance samples, the group of said luminance samples being compressed in accordance with a ratio M/N and the group of said chrominance samples being compressed in accordance with a ratio (N-M)/N, wherein M and N are integers and M is greater than N-M, comprising:

first and second storage means associated with said time compressed luminance signal;

timing means responsive to said horizontal and vertical sync pulses for generating first, second and third frequencies corresponding to the integers, N, M and N-M, respectively;

coincidience detecting means for detecting a coincidence between one of said horizontal sync pulses and each of said vertical sync pulses;

first read-write control means responsive to the detection of said coincidence for initiating writing the group of luminance samples during alternate line intervals into said first and second storage means at said first frequency so that the line intervals during which said luminance samples are written into said first storage means alternate with those during which the luminance samples are written into said second storage means, and reading luminance samples from said first and second storage means during alternate line intervals at said second frequency so that the line intervals during which said luminance samples are read out of said first storage means alternate with those during which the luminance samples are read out of said second storage means;

third storage means associated with said time compressed chrominance signal; and second read-write control means responsive to each of said horizontal sync pulses for storing the group of said chrominance samples of each video line into said third storge means at said first frequency and subsequently reading chrominance samples out of the third storage means at said third frequency.

2. Apparatus as claimed in claim 1, wherein each of said first and second storage means has addressable storage locations in which said luminance samples are respectively stored, said first storage means being in a write mode during a first one of the alternate line intervals and in a read mode during a second one of the alternate line intervals, and said second storage means being in a write mode during said second line interval and in a read mode during said first line interval, wherein said first read-write control means comprises:

first address counter means enabled in response to the detection of said coincidence for incrementing a first address count at first frequency during said first line interval and at said second frequency during said second line interval and accessing the storage locations of said first storage means in accordance with said first address count; and second address counter means enabled in response to the detection of said coincidence for incrementing a second address count at said second frequency during said first line interval and at said first frequency during said second line interval and accessing the storage locations of said second storage means in accordance with said second address count.

3. Apparatus as claimed in claim 1, wherein said third storage means has addressable storage locations in which said chrominance samples are stored, said second read-write control means comprising:

a phase-locked loop including a phase comparator having a first input to which said horizontal sync pulses are applied and a second input, and a variable frequency oscillator means connected to be responsive to the output of said phase comparator through a low-pass filter for generating an output signal having a frequency equal to said first frequency; and an address means responsive to the frequency of said output signal of said variable frequency oscillator means for incrementing a first address count during a first portion of each line interval until said first address count reaches a first predetermined value and writing said chrominance samples into the storage locations of said third storage means in accordance with said first address count and subsequently incrementing a second address count at a reduced rate during a second portion of each line interval until said second address count reaches a second predetermined value and reading chrominance samples from the storage locations of the third storage means in accordance with said second address count, a ratio of said reduced rate to the rate at which said first address count is incremented being equal to (N-M)/N, said address counter further supplying an output signal at a frequency equal to the frequency of said horizontal sync pulses to the second input of said phase comparator.

4. Apparatus as claimed in claim 2, wherein said third storage means has addressble storage locations in which said chrominance samples are stored, said second read-write control means comprising:

a phase-locked loop including a phase comparator having a first input to which said horizontal sync pulses are applied and a second input, and a variable frequency oscillator means connected to be responsive to the output of said phase comparator through a low-pass filter for generating an output signal having a frquency equal to said first frequency; and a third address counter means responsive to the frequency of the output signal of sad variable frequency oscillator means for incrementing a third address count during a first portion of each line interval until said first address count reaches a first predetermined value for writing said chrominance samples into the storage locations of said third storage means in accordance with said third address count and subsequently incrementing a fourth address count at a reduced rate during a second portion of each line interval until said fourth address count reaches a second predetermined value and reading chrominance samples from the storage locations of the third storage means in accordance with said fourth address count, a ratio of said reduced rate to the rate at which said third address count is incremented being equal to (N-M)/N, said thid address counter further supplying an output signal at a frequency equal to the frequency of said horizontal sync pulses to the second input of said phase comparator.

* * * * *